No. 744,352. PATENTED NOV. 17, 1903.
T. T. JOHNSTON.
ROTARY PUMP.
APPLICATION FILED AUG. 8, 1902.
NO MODEL. 2 SHEETS—SHEET 2.
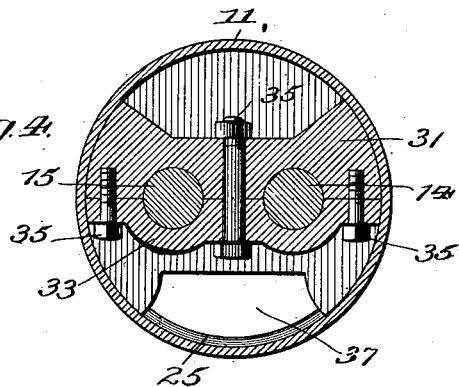
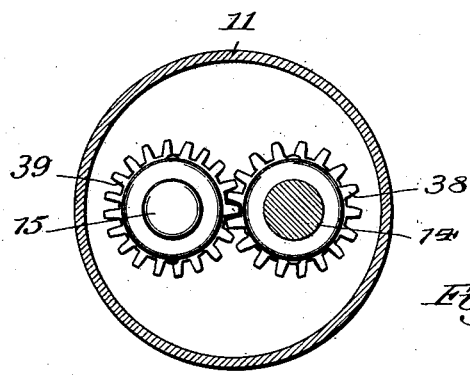
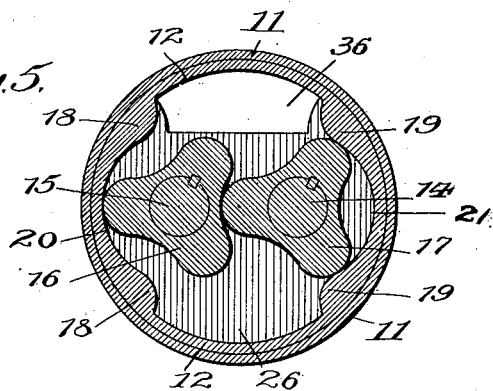
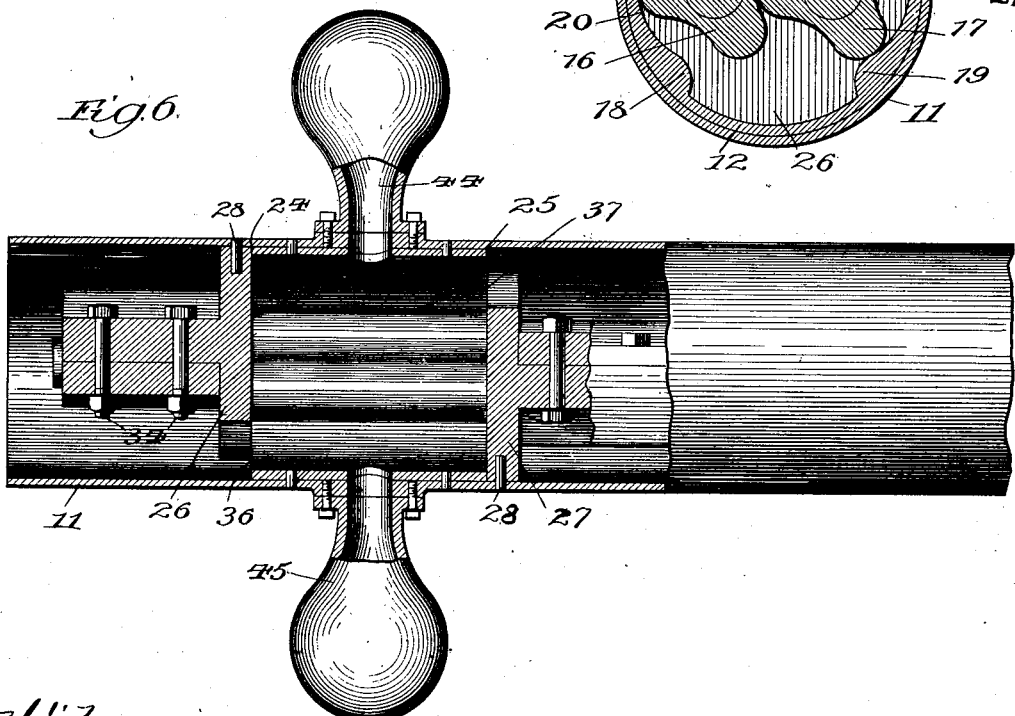
Inventor,
Thomas Taylor Johnston, No. 744,352.

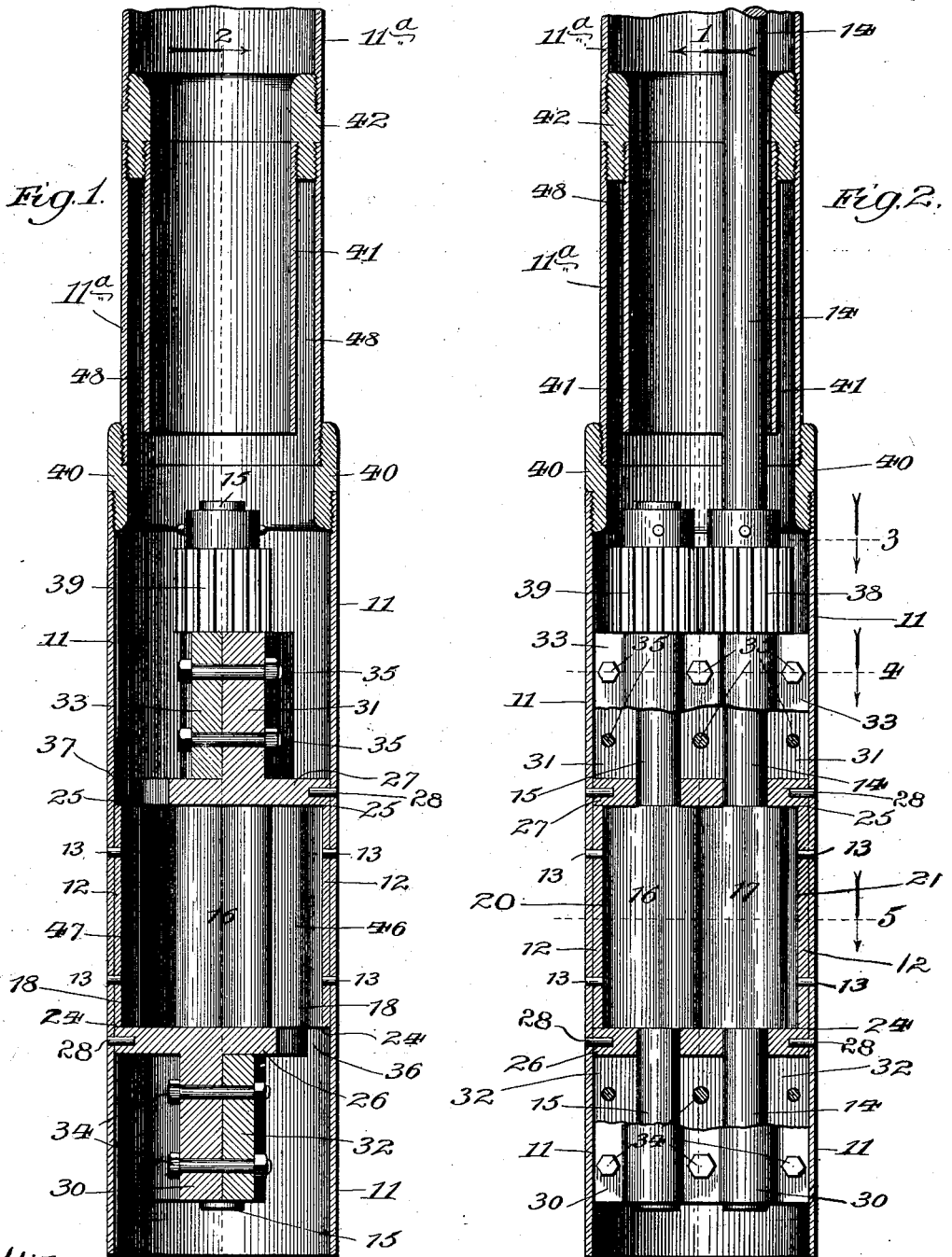

Patented November 17, 1903.

UNITED STATES PATENT OFFICE.

THOMAS TAYLOR JOHNSTON, OF CHICAGO, ILLINOIS.

ROTARY PUMP.

SPECIFICATION forming part of Letters Patent No. 744,352, dated November 17, 1903.

Application filed August 8, 1902. Serial No. 118,910. (No model.)

*To all whom it may concern:*

Be it known that I, THOMAS TAYLOR JOHNSTON, a citizen of the United States, residing at Evanston, a suburb of the city of Chicago, in the county of Cook and State of Illinois, have invented a new and useful Rotary Pump, of which the following is a specification in its best form now known to me, reference being had to the accompanying drawings, in which similar numerals indicate the same parts throughout the several views.

My invention relates to rotary pumps. Its object is to provide a pump of compact form for use in small spaces, which can be easily and cheaply constructed, which shall be efficient in operation, and not likely to get out of order.

It consists in such a pump having means for automatically cooling the bearings and for maintaining constant the flow of liquid pumped.

It consists in a novel form of air-chamber and the combination of it with the pump and in many details of construction and arrangement hereinafter more fully described and claimed.

In the drawings, Figure 1 is a side, and Fig. 2 a plan, view of a machine embodying my invention. Figs. 3, 4, and 5 are sectional detail views taken on lines 3 4 5 of Fig. 2. Fig. 6 is a detailed view of a modified form of construction, showing air-chambers on both suction and discharge sides of the pump.

Referring again to the drawings, 11 indicates the outer casing of the machine, made preferably of ordinary pipe and frequently being the main pipe, through which water is to be pumped. Inside of the outer case or pipe 11 is the lining 12, secured thereto by means of screws or pins 13. Journaled inside the lining 12 on shafts 14 and 15 are lobed impellers 16 and 17, shaped in any of the two common forms, (one form of which is as shown,) so that when revolved at equal speeds they will always be close enough to each other to do pumping. The lining 12 has raised portions 18 and 19, cut away in curves 20 and 21, having their centers in the centers of the two shafts 14 and 15 and their radii equal to the greatest length of an impeller lobe or arm. As the impellers rotate the outer portion of at least one lobe or arm will be close enough to the lining 12 to afford pumping ability. The raised portions 18 and 19 are of sufficient length so that, as shown in Fig. 5, at least one of the impeller lobes or arms will always be adjacent to the lining 12. If the outer case is a special one, instead of a pipe these portions 12 inclosing the impellers may be made directly on the inside of the case itself instead of on the lining secured thereto. The essential thing is that the lining should inclose the impellers a sufficient distance so that they can pump.

Fitted against the ends 24 and 25 of the lining 12 and in contiguity with the ends of the impellers are end plates 26 and 27, each filling the cross-section of the pipe 11 and being secured thereto by means of screws or pins 28. Integral with these end plates 26 and 27 are the journal-bearings 30 and 31, in which the shafts 14 and 15 rest, being held in position by the caps 32 and 33, held in position by bolts 34 and 35, respectively. End plate 26 has cut in one edge between the projections 18 and 19, heretofore described, an opening 36, large enough to admit a sufficient supply of water into chamber 46 on one side of the impellers, and in the end plate 27, but on the opposite side of the pipe or case, is a similar opening 37, affording an exit from chamber 47.

The shafts 14 and 15 are geared together by pinions 38 and 39 and may be similarly geared at both ends, if desired, and one shaft—as, for instance, 14—is extended outside of the mechanism just described and has connected to it an electric motor or other suitable source of power. Assuming that the pump is of the form shown in Figs. 1 and 2, the impeller mechanism may be at the bottom of a pipe many hundreds of feet in length and the shaft extend up the pipe to the motor above ground. If the shaft is thus very long, the shaft should of course be supported at various points along the pipe.

In order to provide an air-chamber when the pump is used below ground, I insert inside the pipe $11^a$ (which is merely an extension of pipe 11, secured to it by the coupling 40) a short piece of pipe 41, the same being secured in position by means of the inside coupling 42. When this construction is completed, the space 48 between $11^a$, 42, and 41 acts as an air-chamber in the manner hereinafter described. If desired, a duplicate construction may be placed inside of the pipe supplying the water, the open end of space 48 being placed away from the pump.

When the pump is to be used above ground or elsewhere where there is plenty of room, I attach to the two water-chambers 46 and 47 adjacent to the openings 36 and 37, respectively, a pair of air-chambers 44 and 45, one of which keeps the inflow of water constant while the other regulates the outflow. These air-chambers regulate the pressure of water in the same manner that similar chambers act on fire-engines.

In the operation of my invention I place the pump illustrated in the drawings with its lower end, Figs. 1 and 2, connected with the source of water which is to be pumped and start the power which rotates shaft 15, thereby, through pinions 38 and 39, rotating the impellers 16 and 17. This motion of the impellers pumps water up around the bearings 30 32, thence through the opening 36 into the chamber 46, thence through the impellers in the usual manner into chamber 47, the impeller-blades driving the water before them as they pass along the portions 18 and 19, respectively, of the lining. From chamber 47 the water is forced up through opening 37 around bearings 31 33, thence up through pipe 41, and on, up, and out through pipe 11ᵃ, the air-space 48 acting as an air-chamber in the usual manner to take up the irregularity of action of the pump.

In practice I preferably make the bearings 30 32 and 31 33 of lignum-vitæ and, as shown, omit all oil-cups and stuffing-boxes. As the construction described allows the flowing water, both incoming and outgoing, to pass over and around the bearings, they are kept perfectly cool at all times.

I have in practice run a pump embodying my invention at a speed of three hundred revolutions per minute for six months at a continuous stretch, same showing ninety per cent. efficiency by actual test. By this construction I am able to insert the pump directly in the pipe of a well and lower it to any desired depth by simply lengthening the pipe. The pump is perfectly reversible and may be made to run in either direction.

I do not wish to be limited to the exact details of construction, which may be varied within reasonable limits without departing from my invention.

Having thus described my invention, what I claim as new, and desire to secure by Letters Patent, is—

1. In a rotary pump, the combination of a cylindrical case, preferably an ordinary water-pipe, a pair of cross-partitions in said pipe or case each having an opening adapted to admit the passage of liquid which is to be pumped, said openings being on approximately opposite sides of the pipe, a pair of rotatable shafts with their axes parallel to the axis of the water-pipe, a pair of impellers in pumping relation with each other mounted on said shafts between said cross-partitions, projections inside of the pipe between said partitions closely inclosing said impellers over a sufficient distance to permit the impellers to pump, said inclosing portions being on approximately opposite portions of the circumference of the pipe and so located as not to obstruct the passage of water through said openings in the partitions and means for applying power to one of said shafts.

2. In a rotary pump, the combination of a cylindrical case preferably an ordinary water-pipe, a pair of cross-partitions in said case or pipe each having an opening adapted to admit the passage of liquid which is to be pumped, said openings being on approximately the opposite sides of the pump, a pair of rotatable shafts with their axes parallel to the axis of the water-pipe, a pair of impellers in pumping relation with each other mounted on said shafts between said cross-partitions, a detachable lining secured to the inside of the pipe between said partitions closely inclosing said impellers over a sufficient distance to permit the impellers to pump, said inclosing portions being on approximately opposite portions of the circumference of the pipe and so located as not to obstruct the passage of water through said openings in the partitions and means for applying power to one of said shafts.

3. In a rotary pump, the combination of a cylindrical case, preferably an ordinary water-pipe, a pair of cross-partitions in said case or pipe each having an opening adapted to admit the passage of liquid which is to be pumped, said openings being on approximately opposite sides of the pipe, a pair of rotatable shafts with their axes parallel to the axis of the water-pipe, a pair of impellers in pumping relation with each other mounted on said shafts between said cross-partitions, projections inside of the pipe between said partitions closely inclosing said impellers over a sufficient distance to permit the impellers to pump, said inclosing portions being on approximately opposite portions of the circumference of the pipe and so located as not to obstruct the passage of water through said openings in the partitions, means for applying power to one of said shafts and an air-chamber inside the discharge-pipe with its mouth in proximity to the discharge-opening of the pump.

4. In a rotary pump, the combination of a cylindrical case, preferably an ordinary water-pipe, a pair of cross-partitions in said case or pipe each having an opening adapted to admit the passage of liquid which is to be pumped, said openings being on approximately opposite sides of the pipe, a pair of rotatable shafts, with their axes parallel to the axis of the water-pipe, a pair of impellers in pumping relation with each other mounted on said shafts between said cross-partitions, projections inside the pipe between said partitions and inclosing said impellers over a sufficient distance to permit the impellers to pump, said inclosing portions being on approximately opposite portions of the pipe and so located as not to obstruct the passage of water through said openings in the partitions, means for applying power to one of said shafts and a smaller pipe 46 secured inside the main discharge-pipe so as to form an air-chamber 48 with its mouth in proximity to the discharge-opening of the pump.

5. In a rotary pump the combination of a cylindrical case preferably an ordinary water-pipe, a pair of cross-partitions in said pipe or case each having an opening adapted to admit the passage of liquid which is to be pumped, said openings being on approximately opposite sides of the pipe, a pair of rotatable shafts with their axes parallel to the axis of the water-pipe passing through said cross-partitions and journaled outside thereof, a pair of impellers in pumping relation with each other mounted on said shafts between said cross-partitions, projections inside of the pipe between said partitions closely inclosing said impellers over a sufficient distance to permit the impellers to pump, said inclosing portions being on approximately opposite portions of the circumference of the pipe and so located as not to obstruct the passage of water through said openings in the partitions and means for applying power to one of said shafts.

6. In a rotary pump, the combination of an ordinary water-pipe, a pair of cross-partitions in said pipe, each having an opening adapted to admit the passage of liquid which is to be pumped, said openings being on the opposite sides of the pipe, a pair of shafts passing through said cross-partitions and journaled outside thereof, a pair of impellers mounted on the said shafts between the said cross-partitions, a lining secured to the inside of the pipe and closely inclosing said impellers over a sufficient distance to permit the said impellers to pump, said inclosing portions being in the opposite portions of the circumference of the pipe between the liquid-supply openings in the cross-partitions, pinions on said shafts adapted to cause the said impellers to rotate in the opposite directions and means for applying power to one shaft, for the purposes set forth.

7. In a rotary pump, the combination of an ordinary pipe, a pair of cross-partitions in the said pipe, each having an opening adapted to admit the passage of liquid which is to be pumped, said openings being on the opposite sides of the pipe, a pair of shafts through the said cross-partitions and journaled outside thereof, a pair of impellers mounted on shafts between the said partitions, a lining secured to the inside of the pipe and closely inclosing said impellers over a sufficient distance to permit the said impellers to pump, said inclosing portions being in the opposite portions of the circumference of pipe between the liquid-supply openings in the cross-partitions, pinions on said shafts adapted to cause said impellers to rotate in the opposite directions, means for applying power to one of said shafts, and an air-chamber inside the discharge-pipe with its mouth in proximity to the discharge-opening of the pump.

8. In a rotary pump, the combination of an ordinary water-pipe, a pair of cross-partitions in the said pipe, each having an opening adapted to admit the passage of liquid to be pumped said openings being on the opposite sides of pipe, a pair of shafts passing through the cross-partitions and journaled outside thereof, a pair of impellers mounted on the said shafts between the cross-partitions, a lining secured to the inside of said pipe and closely inclosing said impellers over a sufficient distance to permit said impellers to pump, said inclosing portions being in the opposite portions of the circumference of the pipe between the liquid-supply openings in the cross-partitions, pinions on said shafts adapted to cause the said impellers to rotate in opposite directions, means for applying power to one of the shafts, and a smaller pipe 41, secured inside the main discharge-pipe, so as to form an air-chamber 48, with its mouth in proximity to the discharge-opening of the pump.

THOMAS TAYLOR JOHNSTON.

Witnesses:
GEO. C. DAVISON,
DWIGHT B. CHEEVER.